3,062,867
M-(1-ETHYLPROPYL) PHENYL N-METHYL-
CARBAMATE
Gustave K. Kohn, Berkeley, Joseph E. Moore, Pinole, and Joseph N. Ospenson, Concord, Calif., assignors to California Research Corporation, San Francisco, Calif., a corporation of Delaware
No Drawing. Filed June 8, 1959, Ser. No. 818,568
1 Claim. (Cl. 260—479)

This invention relates to a new compound; namely, m-(1-ethylpropyl) phenyl N-methylcarbamate and its use as a cholinesterase inhibitor in agricultural pesticide formulations.

One of the ultimate criteria relating to the effectiveness of certain agricultural pesticides which function as digestive and/or contact toxicants is their ability to inhibit the cholinesterase enzyme system of the animal parasite. This type of functional activity is primarily responsible for the effectiveness of at least two of the recognized classes of synthetic organic pesticides; namely, the phosphates and carbamates. Recently, the pesticidal effectiveness of certain carbamic acid esters has been recognized, and efforts have been directed to the synthesis and development of specific carbamate esters of increased cholinergic activity.

There has now been discovered a unique compound, namely m-(1-ethylpropyl) phenyl N-methylcarbamate, whose anti-cholinesterase activity is markedly superior to one of its homologs which is recognized as one of the most active carbamate esters previously known. In fact, the cholinergic activity of the invention compound is of the order of ten times greater than the activity of its homolog; namely, m-t-butylphenyl N-methylcarbamate. This outstanding activity as a cholinesterase inhibitor accentuates its effectiveness as an agricultural pesticide and particularly its application as a digestive and/or contact toxicant for the purpose of inhibiting the cholinesterase function in the cold-blooded animal parasites such as insects, mites, nematodes, arachnids, etc.

The invention compound m-(1-ethylpropyl) phenyl N-methylcarbamate, which is definitive of the following structural formula,

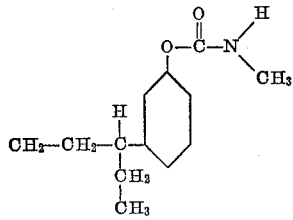

may be prepared (1) by reacting m-(1-ethylpropyl) phenol with methylisocyanate or (2) by reacting m-(1-ethylpropyl) phenol or the corresponding metal phenate with phosgene followed by reaction of the resulting intermediate chloroformate with methylamine.

Of particular significance to the production of the subject cholinesterase inhibitor is the particularity of the alkylphenol reactant and its effect on the final carbamate ester composition. Both the meta positioning and the 1-ethylpropyl radical itself have been found essential to achieve the unique cholinergic activity of the resulting carbamate ester. It is furthermore appreciated that, depending on the method of preparing the alkylphenol, there may exist a variation in the composition of the m-(1-ethylpropyl) phenol reactant. Such variations include the existence of both ring position and side-chain structural isomers. Accordingly, for optimum cholinergic activity, it is desired to employ a m-(1-ethylpropyl) phenol composition which, following reaction to form the carbamate ester, will result in a N-methylcarbamate ester composition containing at least 90 percent by weight of the m-amylphenyl ester of which at least 90 percent by weight consists of the 1-ethylpropyl phenyl ester. While it is preferable to utilize a substantially pure m-(1-ethylpropyl) phenol reactant, it is difficult to separate, with a practical method, the m-(1-ethylpropyl) phenol from its isomers in the form of the free phenol. However, the reactions to produce the carbamate ester permit a more facile separation of the undesired isomers and, accordingly, the composition specifications are based on the composition of the final carbamate ester.

One of the methods of preparing the m-(1-ethylpropyl) phenol reactant involves the alkylation of a halobenzene with pentene-2, or a 3-halopentane in the presence of a Friedel-Craft catalyst and subsequent hydrolysis of the m-(1-ethylpropyl) halobenzene to the corresponding phenol.

Another method involves the reaction of m-methoxy methyl benzoate with a Grignard reagent followed by hydrolysis to form the carbinol. With such a highly substituted configuration, the compound dehydrates to the corresponding m-pentenyl-anisole derivative. The vinyl grouping is saturated by hydrogenation and the methoxy group is cleaved by refluxing with aqueous HBr to form the desired m-(1-ethylpropyl) phenol.

The following examples are illustrative of the preparation of the invention compound.

EXAMPLE I

Preparation of m-(1-ethylpropyl) phenol 18.3 grams of Mg were suspended in 50 ml. of ether and treated with 85.0 grams of bromoethane in 100 ml. of ether. After all the Mg had dissolved, 50.0 grams of methyl-3-methoxy benzoate were added, keeping the temperature below 20° C. Toward the end of the reaction a thick precipitate formed. The complex was destroyed by adding 80 grams of $H_2SO_4$ in 200 ml. of water. The ether phase was separated, washed with water, dried over $Na_2SO_4$ and stripped of ether. A drop of $H_2SO_4$ was added to the residual oil and then distilled. A yield of 47 grams of the m-pentenyl-anisole was obtained, boiling at 87 to 91° C. and 0.5 mm.

This oil was reduced by dissolving in 100 ml. of 95% ethanol, adding 100 mg. $PtO_2$ and hydrogenating at an initial hydrogen pressure of 50 lbs./in.$^2$. The pressure dropped from 50 lbs./in.$^2$ to 20 lbs./in.$^2$ seven times during a four-hour period at room temperature. When hydrogen was no longer absorbed, the catalyst was filtered and the solvent stripped. The oil remaining was the crude m-(1-ethylpropyl) anisole.

This oil was then dissolved in 250 ml. of acetic acid containing 60 grams of 48% aqueous HBr. The solution was heated at 110° C. for 16 hours. The acids were then stripped and the residual oil extracted in aqueous NaOH. After acidification, the oil was extracted with ether, washed with water, dried over $Na_2SO_4$ and stripped. Distillation of the oil yielded 25 grams of the desired m-(1-ethylpropyl) phenol boiling at 80 to 85° C. at 0.4 mm.

EXAMPLE II

Preparation of m-(1-ethylpropyl) phenyl N-methylcarbamate 16 grams of the phenol, 6.0 grams of methyl isocyanate, and a drop of pyridine were sealed in a tube and heated for 16 hours at 100° C. After cooling, the oil was removed and distilled. The fraction boiling at 140° C. at 0.4 mm. was collected and crystallized from mixed hexanes to yield 10.5 grams of white crystals melting at 70 to 72° C. A nitrogen analysis showed 6.27 and 6.22% N (calculated 6.34%). The infrared spectrum verified the substantially quantitative content of the meta isomer.

In the application of the subject compound as a cholinesterase inhibitor, considerable variation in its formulation may be employed. Thus m-(1-ethylpropyl) phenyl N-methylcarbamate may be applied per se or in combination with other active ingredients in both solid or liquid pesticidal formulations. As an example, m-(1-ethylpropyl) phenyl N-methylcarbamate may be formulated into a wettable powder by incorporating it with appropriate quantities of a solid inert carrier, such as talc, limestone, bentonite, diatomaceous earth, etc., and suitable wetting and emulsifying agents, such as the anionic and/or the nonionic surfactants. This mixture is thoroughly mixed and ground to a suitable particle size. For liquid formulations, the subject compound may be dissolved in hydrocarbon solvents or polar solvents or combinations thereof, depending upon the concentration desired, to which a minor quantity of a nonionic or anionic surfactant is added to provide emulsifying and wetting properties. Such liquid concentrates and wettable powders permit easy dispersion in water to practical field dilutions.

The outstanding cholinergic activity of the invention compound is demonstrated by the following standardized test procedure. The activity of the enzyme acetylcholinesterase involves a reaction function with the substrate acetylcholine resulting in the formation of choline and acetic acid. In this test, the enzyme actvity is determined by the amount of acetic acid liberated and is measured in terms of the change in pH in the presence of a standard buffer solution over a definite time period. The results are reported as the $I_{50}$ value which is defined as the quantity of inhibitor measured in micrograms per milliliter (gamma/ml.) which gives 50 percent inhibition.

For this test, acetylcholinesterase was obtained as a purified and stabilized enzyme from bovine erythrocytes; and the buffer employed contained 0.0367 mole sodium diethylbarbiturate, 1.20 moles potassium chloride, and 0.008 mole potassium dihydrogen phosphate per liter adjusted to a pH of 8.0. A stock solution of the candidate inhibitor containing 1 mg./ml. in methanol was prepared. Aliquots were then diluted with water to the test concentrations, which are usually between 0.01 and 10 gamma/ml. A series of concentrations are run concurrently. 1.0 ml. of the inhibitor solutions, adjusted to test concentrations, is added to a 10 ml. beaker containing a magnetic flea. Simultaneously, a stop watch is started and 2.0 ml. of a standard enzyme plus buffer solution are added. The contents are agitated thoroughly and placed in a bath maintained at 25.0°±0.1° C. After exactly 30 minutes, there is added 0.1 ml. of a standard acetyl choline bromide solution which had been allowed to come to the bath temperature. Following thorough agitation, the covered beaker is returned to the constant temperature bath. At exactly 90 minutes, the pH is measured on a Beckman Model G or equivalent pH meter.

The percent inhibition is then calculated from the pH values obtained for the blank, uninhibited enzyme, and the candidate inhibitor. A curve is then prepared by plotting on semi-logarithmic graph paper the concentration of the inhibitor in gamma/ml. on the log scale versus percent inhibition on the linear scale. The curve will be S-shaped. The concentration where the curve crosses the 50 percent inhibition mark is the $I_{50}$ value.

The superior cholinergic activity or cholinesterase inhibition of m-(1-ethylpropyl) phenyl N-methylcarbamate is attested by the following results in comparison with its homolog; namely, m-t-butylphenyl N-methylcarbamate.

| Compound: | $I_{50}$ |
|---|---|
| m-t-Butylphenyl N-methylcarbamate | 0.11 |
| m-(1-ethylpropyl) phenyl N-methylcarbamate | 0.0095 |

Obviously, many modifications and variations of the invention as hereinbefore set forth may be made without departing from the spirit and scope thereof, and therefore only such limitations should be imposed as are indicated in the appended claim.

We claim:
M-(1-ethylpropyl) phenyl N-methylcarbamate.

References Cited in the file of this patent

UNITED STATES PATENTS

| 2,208,485 | Aeschlimann | July 16, 1940 |
| 2,362,508 | Stevens et al. | Nov. 14, 1944 |
| 2,677,698 | Deutschman et al. | May 4, 1954 |
| 2,776,197 | Gysin et al. | Jan. 1, 1957 |
| 2,843,519 | Fitch | July 15, 1958 |
| 2,854,374 | Huisman et al. | Sept. 30, 1958 |

OTHER REFERENCES

Kolbezen et al.: "Agricultural and Food Chemistry," vol. 2, pages 864–70, 1954.